Feb. 4, 1930.                    C. DORNIER                   1,745,749
                              FLYING MACHINE
                          Filed Sept. 29, 1926          2 Sheets-Sheet 1
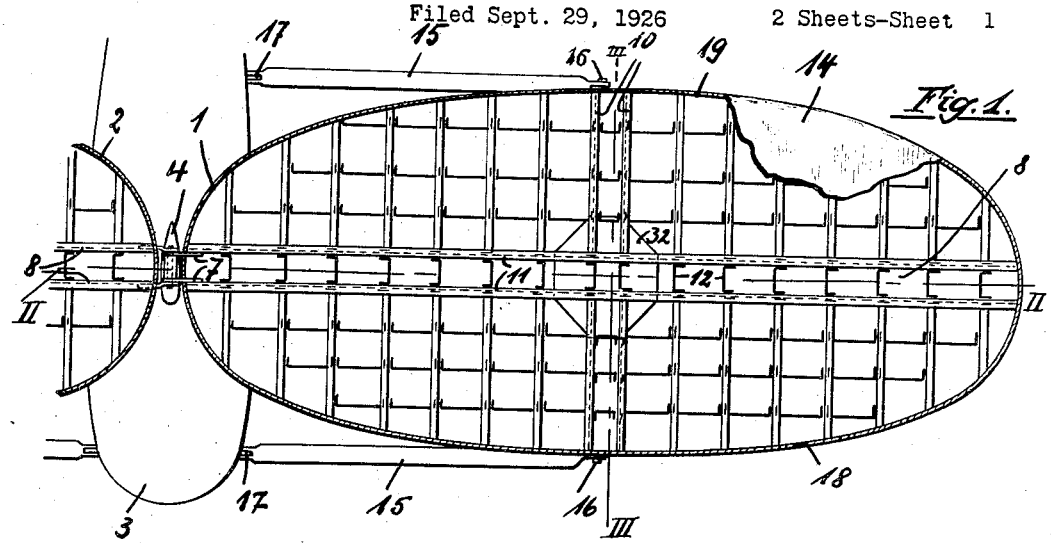
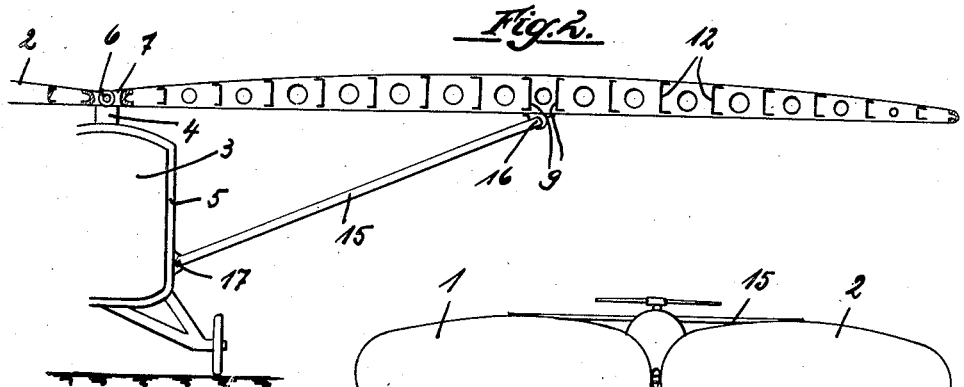
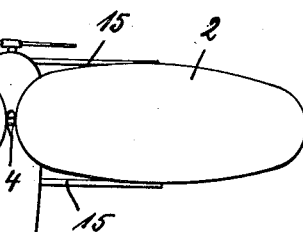
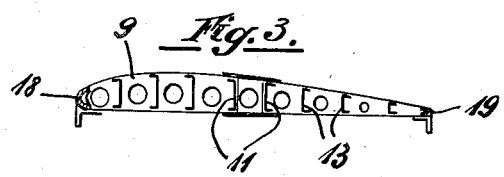
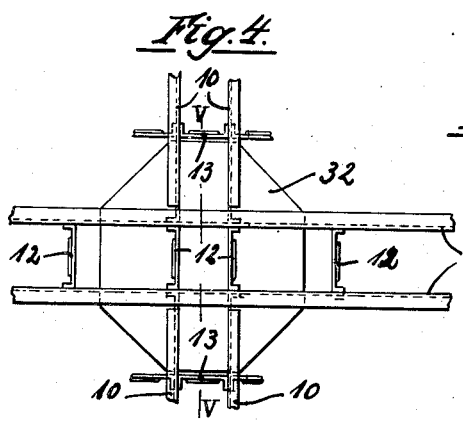
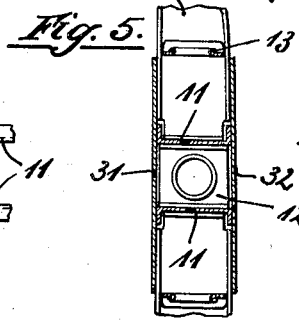
Inventor:
Claudius Dornier
by K_____
          Atty.

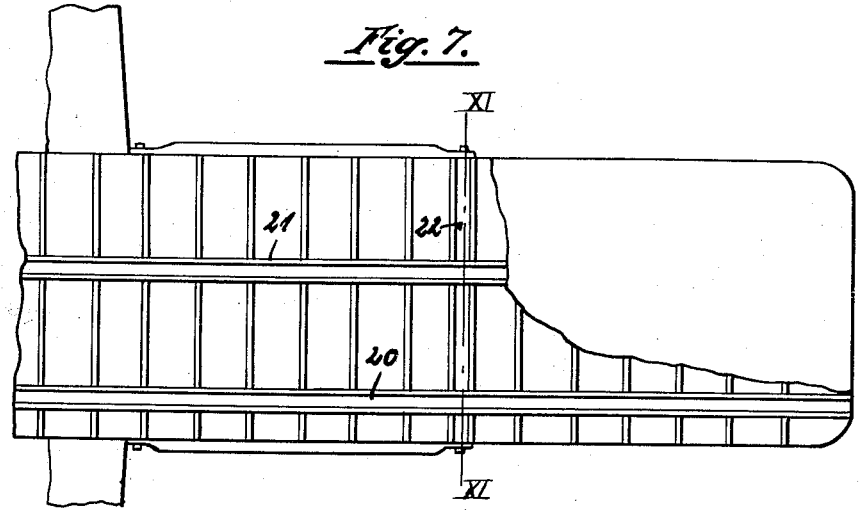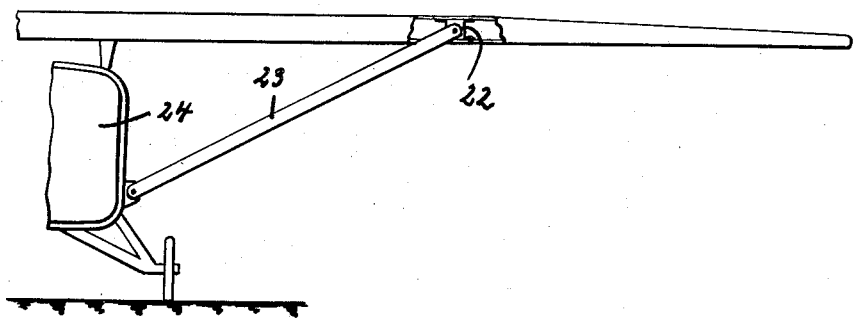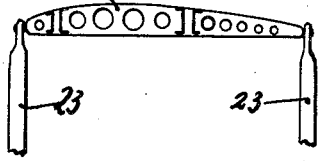

Patented Feb. 4, 1930

1,745,749

UNITED STATES PATENT OFFICE

CLAUDIUS DORNIER, OF FRIEDRICHSHAFEN-ON-THE-BODENSEE, GERMANY, ASSIGNOR OF ONE-HALF TO DORNIER-METALLBAUTEN GESELLSCHAFT MIT BESCHRÄNKTER HAFTUNG, OF FRIEDRICHSHAFEN-ON-THE-BODENSEE, GERMANY

FLYING MACHINE

Application filed September 29, 1926, Serial No. 138,437, and in Germany October 19, 1925.

My invention relates to flying machines and more especially to the wings or bearing planes forming part thereof. It is an object of my invention to provide wings of superior strength, less weight and more favorable aerodynamic properties as compared with the wings of flying machines hitherto in use. In speaking of wings, I intend to include also other surfaces forming part of a flying machine, such as for instance the steering surfaces or rudders.

The wings of flying machines as hitherto designed, and more especially wings of the self-supporting type, have a pair of longitudinal spars, i. e. spars extending longitudinally of the wing and substantially at right angles to the hull or fuselage. To these spars are fixed the transverse ribs, which extend across the wing and substantially parallel to the fuselage. The forces acting on the longitudinal spars substantially at right angles to the wing surface are as a rule taken up by a frame work construction extending substantially at right angles or at a pointed or an obtuse angle to the wing surface, and the simplest form of such frame work are a pair of struts or braces extending at a pointed angle from the middle portion of the wing to the fuselage. In view of the fact that as a rule both the longitudinal spars and the struts or braces of each pair closely adjoin each other, these struts or braces are frequently subject to very considerable torsional stress.

According to the present invention now, these struts or braces are spaced farther apart so as to diminish the torsional stresses acting on them, whereby I am enabled to use braces having a smaller diameter and therefore entailing a considerable saving in weight and air resistance. To this end the braces, instead of being connected to the longitudinal spars themselves are attached to a girder extending transversely to the longitudinal spars and preferably in the same plane. I thus obtain a wing skeleton having for instance substantially the form of a cross, which may now be formed of a single longitudinal spar of girderlike construction and a transversal girder supporting same and being braced against the fuselage by the two struts or braces aforesaid, while one end of the longitudinal spar is connected with the fuselage either directly or by means of a frame work construction. The longitudinal spar or girder to which are fixed the transverse ribs, as usual, can simply be linked to the side or top of the fuselage.

In order, further, to reduce as far as possible the strain acting on the transverse ribs, I have found it useful, from a static point of view, to form the wing, which heretofore had more or less the form of a rectangle, with strongly rounded corners by making the end ribs shorter than the middle ribs. I thus obtain a wing of substantially elliptical form. Aerodynamic tests and calculations have shown that contrary to the ideas hitherto prevailing in this respect a wing of this form will not be inferior in aerodynamic efficiency and superior in static respect to a wing as hitherto constructed. It further involves the advantage that the range of vision of the pilot is almost unobstructed by the wing. Moreover in flying machines having a single engine the fact that only a very small part of the wing projects into the air current generated by the propeller involves a material reduction of the disturbances of the current caused by the wing, so that an increased efficiency of the propeller is obtained. Extended investigations have shown that the air flow as a whole is greatly improved.

In order to relieve as far as possible the load resting on the spars I prefer constructing the front edge and, in certain cases also the rear edge of the wing as a self-supporting member, whereby the wing as a whole with the intercrossing spar and transversal girder and the surrounding members forms a rigid structure.

In the drawings affixed to this specification and forming part thereof two forms of a flying machine of the monoplane type embodying my invention are illustrated diagrammatically by way of example.

In the drawings

Fig. 1 is a plan view of a wing and part of the fuselage of the first modification, the skin or covering being removed, Fig. 2 is a longitudinal section on the line II—II in Fig. 1, Fig. 3 is a cross-section on the line III—III in Fig. 1, Fig. 4 is a plan view, drawn to a larger scale, of the place where the longitudinal and transverse girders cross each other, Fig. 5 is a cross-section on the line V—V in Fig. 4, Fig. 6 is a plan view showing the flying machine as a whole, drawn to a smaller scale, Fig. 7 is a plan view, corresponding to the one shown in Fig. 1, of the second modification, Fig. 8 is a front view, partly in section, and Fig. 9 is a cross-section on the line IX—IX in Fig. 7.

Referring first to Figs. 1–6, 1 and 2 are the two wings and 3 is the fuselage of a monoplane, 4 is a streamlined beam mounted on and forming part of a cross frame 5 of the fuselage and 6 is a hinge pin supported in said beam and extending through eyes in connecting members fixed to the inner ends of the longitudinal girder-shaped spars 8, 9 of the wings, which are thus hinged to the fuselage, which may also have the form of a boat. Each wing skeleton comprises a longitudinal girder 8 and a transverse girder 10, assembling plates 31 and 32 being fixed to and connecting the top and bottom flanges of said spar and transversal girder, respectively. The longitudinal girder 8 is formed of a pair of channels 11, 11 connected by channeled cross-beams 12. The transversal girder 9 is likewise composed of a pair of channels 10, 10 connected by cross-beams 13. Ribs 14 extending in parallel to the transversal girder are attached to the longitudinal girder in any suitable manner, and to the skeleton structure thus formed is fixed the outer skin or covering 14. The wing is braced against the fuselage by means of two struts or braces 15 hinged to opposite ends of the transversal girder 10 by means of pins 16, and with pins 17 to the fuselage. The front and rear edges of the wing are braced by means of channels 18 and 19, respectively.

The length of the end ribs is inferior to that of the middle ribs and the channels 18 and 19 connecting their ends are curved and joined together to form a wing structure having approximately elliptical form.

In the modification illustrated in Figs. 7–9 the form of the wing approaches a rectangle with rounded corners, but the main difference lies in the provision of a pair of longitudinal girders 20, 21, as against the single longitudinal girder in the first modification, these two girders being supported by and connected with a transversal girder 22, to the ends of which are attached the outer ends of the struts or braces 23, hinged to the fuselage 24.

I wish it to be understood that I do not desire to be limited to the exact details of construction shown and described for obvious modifications will occur to a person skilled in the art.

I claim:—

1. Flying machine comprising a fuselage, a wing, a transversal girder forming part and extending between the front and rear edges of said wing and a pair of struts extending from the ends of and bracing said transversal girder against said fuselage.

2. Flying machine comprising a fuselage, a wing, a longitudinal girder and a transversal girder forming part and extending between the front and rear edges of said wing and a pair of struts extending from the ends of and bracing said transversal girder against said fuselage.

3. Flying machine comprising a fuselage, a wing, a longitudinal girder extending across the entire width of said wing, a transversal girder extending between the front and rear edges of said wing and fixed to and acting as a support for said longitudinal girder and a pair of struts attached to the ends of said transversal girder and to said fuselage and acting towards bracing said wing against said fuselage.

4. Flying machine comprising a fuselage, a wing hinged to said fuselage, a longitudinal girder extending across the entire width of said wing, a transversal girder extending between the front and rear edges of said wing and fixed to and acting as a support for said longitudinal girder and a pair of struts attached to the ends of said tranversal girder and to said fuselage and acting towards bracing said wing against said fuselage.

5. Flying machine comprising a fuselage, a wing, a longitudinal girder extending across the entire width of said wing, a transversal girder extending between the front and rear edges of said wing and fixed to and acting as a support for said longitudinal girder and a pair of struts attached to the ends of said transversal girder and to said fuselage and acting towards bracing said wing against said fuselage.

6. Flying machine comprising a fuselage, a wing, a longitudinal girder and a transversal girder forming part and extending across the entire width of said wing, a pair of struts extending from the ends of and bracing said transversal girder against said fuselage, and a self-supporting front edge member.

In testimony whereof I affix my signature.

CLAUDIUS DORNIER.